United States Patent
Nakagawa et al.

(10) Patent No.: US 12,165,677 B2
(45) Date of Patent: Dec. 10, 2024

(54) MAGNETIC HEAD WITH STACKED BODY CONFIGURATIONS AND MAGNETIC RECORDING DEVICE INCLUDING THE SAME

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Yuji Nakagawa, Kawasaki Kanagawa (JP); Masayuki Takagishi, Kunitachi Tokyo (JP); Naoyuki Narita, Funabashi Chiba (JP); Tomoyuki Maeda, Kawasaki Kanagawa (JP); Tazumi Nagasawa, Yokohama Kanagawa (JP); Ryo Osamura, Kawasaki Kanagawa (JP); Kosuke Kurihara, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/165,101

(22) Filed: Feb. 6, 2023

(65) Prior Publication Data
US 2024/0046959 A1   Feb. 8, 2024

(30) Foreign Application Priority Data
Aug. 8, 2022   (JP) .................................. 2022-126244

(51) Int. Cl.
*G11B 5/235*   (2006.01)
*G11B 5/127*   (2006.01)
(Continued)

(52) U.S. Cl.
CPC .......... *G11B 5/3116* (2013.01); *G11B 5/1278* (2013.01); *G11B 5/235* (2013.01);
(Continued)

(58) Field of Classification Search
None
See application file for complete search history.

(56) References Cited

U.S. PATENT DOCUMENTS 9,064,508 B1    6/2015  Shiimoto et al.
10,032,470 B1 * 7/2018  Degawa et al. ..... G11B 5/3146
(Continued)

FOREIGN PATENT DOCUMENTS

JP   2008-277586 A   11/2008
JP   2022-12263 A    1/2022
JP   2022-129730 A   9/2022

OTHER PUBLICATIONS

W. Zhou et al., "Inducing out-of-plane precession of magnetization for microwave-assisted magnetic recording with an oscillating polarizer in a spin-torque oscillator," Appl. Phys. Lett. 114, 172403-1 to -5, doi: 10.1063/1.5086476 (2019).

*Primary Examiner* — Craig A. Renner
(74) *Attorney, Agent, or Firm* — Finnegan, Henderson, Farabow, Garrett & Dunner, LLP

(57) ABSTRACT

According to one embodiment, a magnetic head includes a first magnetic pole, a second magnetic pole, and a stacked body. The first magnetic pole includes a first face and a second face crossing the first face. The second face includes a first face region continuous with the first face. The second magnetic pole includes a third face and a fourth face crossing the third face, and the fourth face includes a second face region that is continuous with the third face. The first face and the third face are along the third direction. The stacked body is provided between the first face region and the second face region. The stacked body includes a first
(Continued)

magnetic layer, and a second magnetic layer provided between the first magnetic layer and the second face region. The second magnetic layer includes a second magnetic layer face facing the second face region.

15 Claims, 10 Drawing Sheets

(51) Int. Cl.
*G11B 5/31* (2006.01)
*G11B 5/00* (2006.01)

(52) U.S. Cl.
CPC ............ *G11B 5/314* (2013.01); *G11B 5/3146* (2013.01); *G11B 2005/0024* (2013.01)

(56) References Cited

U.S. PATENT DOCUMENTS

| | | | |
|---|---|---|---|
| 10,121,497 B1* | 11/2018 | Takahashi et al. | G11B 5/235 |
| 2008/0268291 A1 | 10/2008 | Akiyama et al. | |
| 2011/0205655 A1* | 8/2011 | Shimizu et al. | G11B 5/314 |
| | | | 360/246.2 |
| 2012/0262821 A1* | 10/2012 | Taguchi et al. | G11B 5/235 |
| | | | 360/119.02 |
| 2012/0275061 A1* | 11/2012 | Takagishi et al. | G11B 5/3146 |
| | | | 360/125.03 |
| 2014/0211340 A1* | 7/2014 | Sugiura et al. | G11B 5/3133 |
| | | | 360/97.11 |
| 2017/0236537 A1* | 8/2017 | Murakami et al. | G11B 5/1278 |
| | | | 360/125.3 |
| 2022/0005497 A1 | 1/2022 | Takagishi et al. | |
| 2022/0270641 A1 | 8/2022 | Nakagawa et al. | |

\* cited by examiner

MAGNETIC HEAD WITH STACKED BODY CONFIGURATIONS AND MAGNETIC RECORDING DEVICE INCLUDING THE SAME

CROSS-REFERENCE TO RELATED APPLICATIONS

This application is based upon and claims the benefit of priority from Japanese Patent Application No. 2022-126244, filed on Aug. 8, 2022; the entire contents of which are incorporated herein by reference.

FIELD

Embodiments described herein relate generally to a magnetic head and a magnetic recording device.

BACKGROUND

Information is recorded on a magnetic recording medium such as an HDD (Hard Disk Drive) using a magnetic head. It is desired to improve the recording density in the magnetic head and the magnetic recording device.

DETAILED DESCRIPTION

Figure 1A:
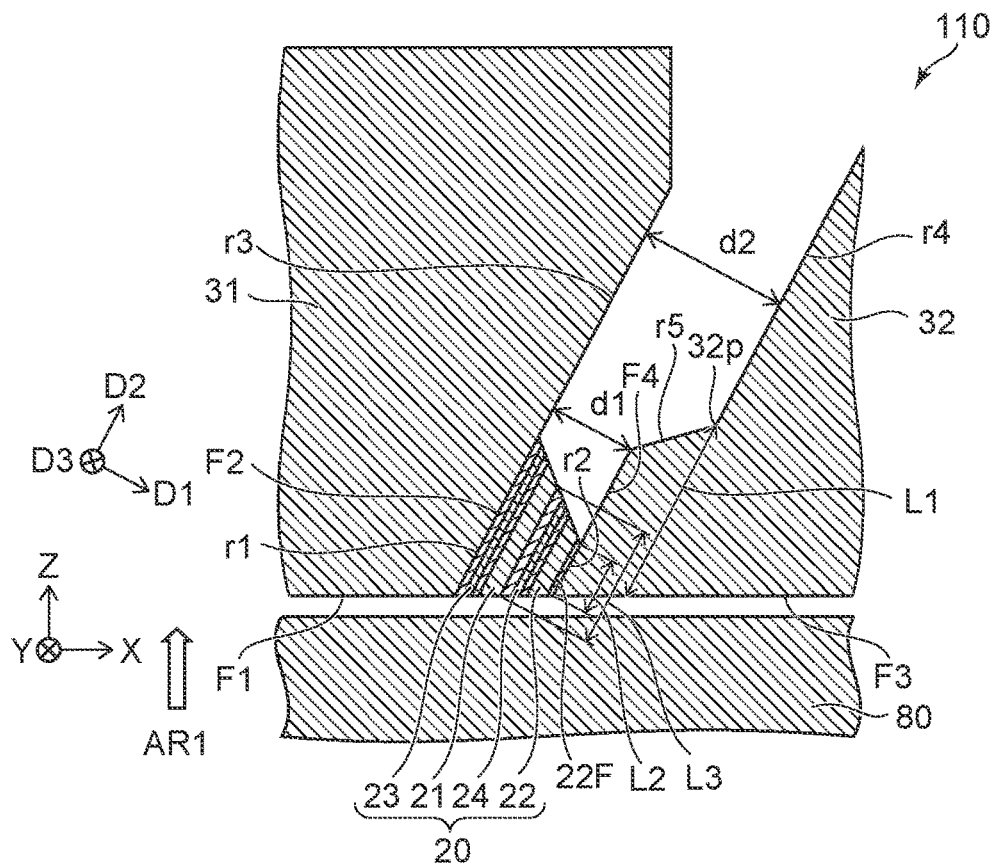
FIGS. 1A and 1B are schematic views illustrating a magnetic head according to a first embodiment.

According to one embodiment, a magnetic head includes a first magnetic pole, a second magnetic pole, and a stacked body. The first magnetic pole includes a first face and a second face crossing the first face. The second face includes a first face region continuous with the first face. The second magnetic pole includes a third face and a fourth face crossing the third face. The fourth face includes a second face region. The second face region is continuous with the third face. A direction from the first face region to the second face region is along a first direction. The first face region and the second face region are along a second direction and a third direction. The third direction crosses a plane including the first direction and the second direction. The first face and the third face are along the third direction. The stacked body is provided between the first face region and the second face region. The stacked body includes a first magnetic layer, and a second magnetic layer provided between the first magnetic layer and the second face region. The second magnetic layer includes a second magnetic layer face facing the second face region. A width ratio of a second width of the second magnetic layer face along the third direction to a first width of the first face region along the third direction is not less than 0.25 and not more than 0.92.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

Figure 1B:
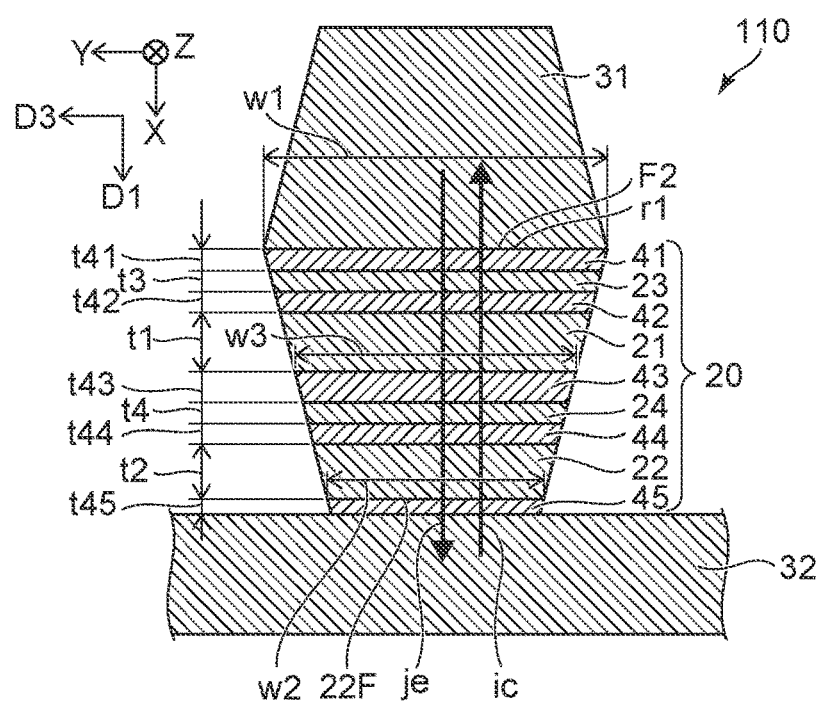

FIGS. 1A and 1B are schematic views illustrating a magnetic head according to a first embodiment.

FIG. 1A is a cross-sectional view. FIG. 1B is a plan view seen from arrow AR1 in FIG. 1A.

Figure 2:
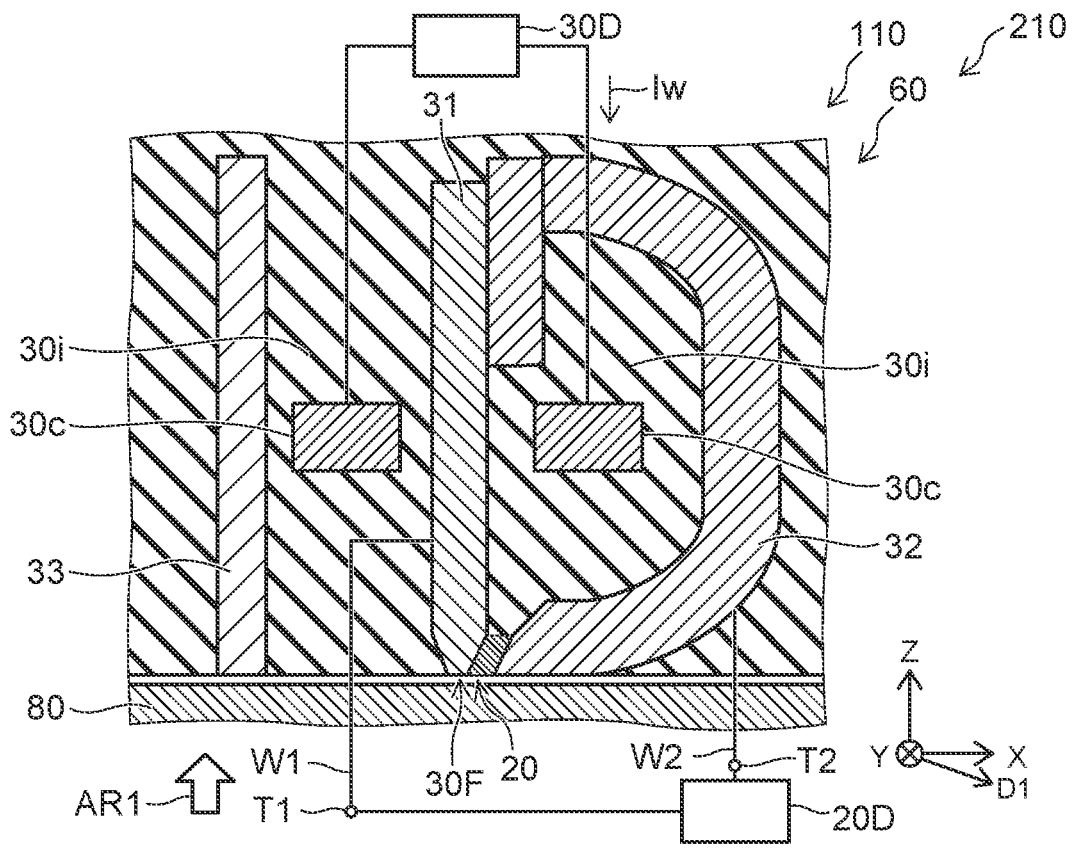
FIG. 2 is a schematic cross-sectional view illustrating the magnetic recording device according to the first embodiment.

FIG. 2 is a schematic cross-sectional view illustrating the magnetic recording device according to the first embodiment.

As shown in FIG. 2, a magnetic recording device 210 according to the embodiment includes a magnetic head 110 and an electric circuit 20D. The magnetic recording device 210 may include a magnetic recording medium 80. At least a recording operation is performed in the magnetic recording device 210. In the recording operation, information is recorded on the magnetic recording medium 80 using the magnetic head 110.

The magnetic head 110 includes a recording part 60. As will be described later, the magnetic head 110 may include a reproducing part. The recording part 60 includes a first magnetic pole 31, a second magnetic pole 32 and a stacked body 20. The stacked body 20 is provided between the first magnetic pole 31 and the second magnetic pole 32.

For example, the first magnetic pole 31 and the second magnetic pole 32 form a magnetic circuit. The first magnetic pole 31 is, for example, a main pole. The second magnetic pole 32 is, for example, a trailing shield.

A direction from the magnetic recording medium 80 to the magnetic head 110 is defined as a Z-axis direction. One direction perpendicular to the Z-axis direction is defined as an X-axis direction. The direction perpendicular to the Z-axis direction and the X-axis direction is defined as a Y-axis direction. The Z-axis direction corresponds to, for example, the height direction. The X-axis direction corresponds to, for example, the down-track direction. The Y-axis direction corresponds to, for example, the cross-track direction. The magnetic recording medium 80 and the magnetic head 110 move relatively along the down-track direction. A magnetic field (recording magnetic field) generated from the magnetic head 110 is applied to a desired position of the magnetic recording medium 80. Magnetization at a desired position of the magnetic recording medium 80 is controlled in a direction according to the recording magnetic field. Information is thus recorded on the magnetic recording medium 80. For example, perpendicular magnetic recording is performed.

As shown in FIG. 2, a coil 30c is provided. In this example, a portion of coil 30c is located between first magnetic pole 31 and second magnetic pole 32. In this example, a shield 33 is provided. The first magnetic pole 31 is located between the shield 33 and the second magnetic pole 32 in the X-axis direction. Another portion of coil 30c is located between shield 33 and first pole 31. An insulating portion 30i is provided between these multiple elements. The shield 33 is, for example, a leading shield. The magnetic head 110 may also include side shields (not shown).

As shown in FIG. 2, a recording current Iw is supplied from the recording circuit 30D to the coil 30c. A recording magnetic field corresponding to the recording current Iw is applied to the magnetic recording medium 80 from the first magnetic pole 31.

As shown in FIG. 2, the first magnetic pole 31 includes a medium facing surface 30F. The medium facing surface 30F is, for example, an ABS (Air Bearing Surface). The medium facing surface 30F faces the magnetic recording medium 80, for example. The medium facing surface 30F spreads, for example, along the X-Y plane.

As shown in FIG. 2, an electric circuit 20D is electrically connected to the stacked body 20. In this example, the stacked body 20 is electrically connected to the first magnetic pole 31 and the second magnetic pole 32. In the magnetic head 110, a first terminal T1 and a second terminal T2 are provided. The first terminal T1 is electrically connected to the stacked body 20 via a first wiring W1 and the first magnetic pole 31. The second terminal T2 is electrically connected to the stacked body 20 via a second wiring W2 and the second magnetic pole 32. For example, a current (for example, direct current) is supplied to the stacked body 20 from the electric circuit 20D.

As shown in FIG. 1B, a current ic is supplied to such the stacked body. The current ic is supplied, for example, from the electric circuit 20D described above. As shown in FIG. 1B, in this example, the current ic has an orientation from the second magnetic layer 22 to the first magnetic layer 21. As shown in FIG. 1B, an electron flow je associated with the current ic has an orientation from the first magnetic layer 21 to the second magnetic layer 22. The orientation of the current ic is from the second magnetic pole 32 to the first magnetic pole 31.

For example, the magnetization of the magnetic layers included in the stacked body 20 oscillates when the current ic of a threshold value or more flows through the stacked body 20. The stacked body 20 functions, for example, as an STO (Spin-Torque Oscillator). Along with the oscillation, an alternating magnetic field (for example, a high frequency magnetic field) is generated from the stacked body 20. The alternating magnetic field generated by the stacked body 20 is applied to the magnetic recording medium 80 to assist the writing to the magnetic recording medium 80. For example, MAMR (Microwave Assisted Magnetic Recording) can be performed.

As shown in FIGS. 1A and 1B, in this example, the stacked body 20 includes a third magnetic layer 23, a fourth magnetic layer 24, a first non-magnetic layer 41, and a second non-magnetic layer 42, a third non-magnetic layer 43, a fourth non-magnetic layer 44 and a fifth non-magnetic layer 45. The insulating portion 30i is omitted in FIGS. 1A and 1B.

The first magnetic pole 31 includes a first face F1 and a second face F2. The second face F2 crosses the first face F1. The second face F2 includes a first face region r1. The first face region r1 is continuous with the first face F1. The first face F1 corresponds to the medium facing surface 30F.

The second magnetic pole 32 includes a third face F3 and a fourth face F4. The fourth face F4 crosses the third face F3. The fourth face F4 includes a second face region r2. The second face region r2 is continuous with the third face F3. The third face F3 is, for example, along a plane that includes the first face F1.

A direction from the first face region r1 to the second face region r2 is along a first direction D1. The first face region r1 and the second face region r2 are along a second direction D2 and a third direction D3. The third direction D3 crosses a plane including the first direction D1 and the second direction D2. The first face F1 and the third face F3 are along the third direction D3. The stacked body 20 is provided between the first face region r1 and the second face region r2.

The third direction D3 is along the Y-axis direction, for example. The first direction D1 may be along the X-axis direction. The first direction D1 is along the gap direction (the direction of the gap between the first magnetic pole 31 and the second magnetic pole 32). The first direction D1 may be inclined with respect to the X-axis direction. The first direction D1 corresponds to the stacking direction of the stacked body 20. The second direction D2 may correspond to the height direction. The second direction D2 may be inclined with respect to the Z-axis direction.

The stacked body 20 includes a first magnetic layer 21 and a second magnetic layer 22. The second magnetic layer 22 is provided between the first magnetic layer 21 and the second face region r2.

As shown in FIGS. 1A and 1B, the second magnetic layer 22 includes a second magnetic layer face 22F. The second magnetic layer face 22F faces the second face region r2. The second magnetic layer face 22F is a face on a side of the second face region r2.

As shown in FIG. 1B, a width along the third direction D3 of the first face region r1 is defined as a first width w1. A width along the third direction D3 of the second magnetic layer face 22F is defined as a second width w2. In the embodiment, a width ratio (w2/w1) of the second width w2 to the first width w1 is not less than 0.25 and not more than 0.92 or less. Thereby, the alternating magnetic field is efficiently generated as described later. Efficient MAMR can be performed. According to the embodiments, it is possible to provide a magnetic head capable of improving the recording density.

As shown in FIG. 1A, the second face F2 may further include a third face region r3. The first face region r1 is between the first face F1 and the third face region r3. The third face region r3 are along the second direction D2 and the third direction D3. The third face region r3 is substantially parallel to the first face region r1. The third face region r3 is continuous with the first face region r1.

As shown in FIG. 1A, the fourth face F4 further includes a fourth face region r4 and a fifth face region r5. A direction from the third face region r3 to the fourth face region r4 is along the first direction D1. The fourth face region r4 is along the second direction D2 and the third direction D3. The fourth face region r4 is substantially parallel to the second face region r2.

A distance along the first direction D1 between the first surface region r1 and the second surface region r2 is defined as a first distance d1.

A distance along the first direction D1 between the first face region r1 and the second face region r2 is defined as a first distance d1. A distance along the first direction D1 between the third face region r3 and the fourth face region r4 is defined as a second distance d2. The first distance d1 is shorter than the second distance d2.

The fifth face region r5 is between the second face region r2 and the fourth face region r4. A plane including the fifth face region r5 crosses a plane including the third face region r3 and a plane including the fourth face region r4.

The second magnetic pole 32 includes a crossing position 32p of the plane including the fifth face region r5 and the plane including the fourth face region r4. In one example, the crossing position 32p is on the fourth face F4. In one example, the crossing position 32p is inside the second magnetic pole 32. The length along the second direction D2 between the crossing position 32p and the third face F3 is defined as a first length L1. The first length L1 corresponds to the effective height of the second magnetic pole 32, for example.

A length along the second direction D2 of the second magnetic layer face 22F is defined as a second length L2. The second length L2 corresponds to, for example, the effective height of the second magnetic layer face 22F. A ratio (L2/L1) of the second length L2 to the first length L1 is defined as a length ratio. In the embodiment, for example, the ratio is preferably not less than 0.1 and not more than 0.85. Thereby, the alternating magnetic field is efficiently generated as described later. Efficient MAMR can be implemented. According to the embodiments, it is possible to provide a magnetic head capable of improving the recording density.

As shown in FIGS. 1A and 1B, in the magnetic head 110, the stacked body 20 may include, for example, the third magnetic layer 23, the fourth magnetic layer 24, the first non-magnetic layer 41, the second non-magnetic layer 42, the third non-magnetic layer 43, the fourth non-magnetic layer 44 and the fifth non-magnetic layer 45. The third magnetic layer 23 is provided between the first magnetic pole 31 and the first magnetic layer 21. The fourth magnetic layer 24 is provided between the first magnetic layer 21 and the second magnetic layer 22.

The first non-magnetic layer 41 is provided between the first magnetic pole 31 and the third magnetic layer 23. The second non-magnetic layer 42 is provided between the third magnetic layer 23 and the first magnetic layer 21. The third non-magnetic layer 43 is provided between the first magnetic layer 21 and the fourth magnetic layer 24. The fourth non-magnetic layer 44 is provided between the fourth magnetic layer 24 and the second magnetic layer 22. The fifth non-magnetic layer 45 is provided between the second magnetic layer 22 and the second magnetic pole 32.

As shown in FIG. 1B, a thickness of the first magnetic layer 21 along the first direction D1 is defined as a first thickness t1. A thickness of the second magnetic layer 22 along the first direction D1 is defined as a second thickness t2. A thickness of the third magnetic layer 23 along the first direction D1 is defined as a third thickness t3. A thickness of the fourth magnetic layer 24 along the first direction D1 is defined as a fourth thickness t4.

In the magnetic head 110, the first thickness t1 is thicker than the third thickness t3. The second thickness t2 is thicker than the fourth thickness t4. The third thickness t3 is, for example, 0.7 times or less the first thickness t1. The fourth thickness t4 is, for example, 0.75 times or less the second thickness t2. For example, the third thickness t3 may be 0.1 times or more the first thickness t1. For example, the fourth thickness t4 may be 0.1 times or more the second thickness t2.

For example, the first magnetic layer 21 and the second magnetic layer 22 may function, for example, as oscillation layers. The third magnetic layer 23 and the fourth magnetic layer 24 may function, for example, as spin injection layers. At least one of the first magnetic layer 21, the second magnetic layer 22, the third magnetic layer 23, and the fourth magnetic layer 24 includes, for example, at least one selected from the group consisting of Fe, Co, and Ni.

In one example of the magnetic head 110, the first thickness t1 is, for example, not less than 3 nm and not more than 15 nm. The first thickness t1 may be, for example, not less than 5 nm and not more than 15 nm. The second thickness t2 is, for example, not less than 5 nm and not more than 15 nm. The third thickness t3 is, for example, not less than 0.5 nm and not more than 5 nm. The fourth thickness t4 is, for example, not less than 0.5 nm and not more than 8 nm.

In the magnetic head 110, the first non-magnetic layer 41 include at least one selected from the group consisting of Ru, Ir, Ta, Rh, Pd, Pt and W, for example. The second non-magnetic layer 42 includes, for example, at least one selected from the group consisting of Cu, Au, Cr, Al, V and Ag. For example, the third non-magnetic layer 43 includes at least one selected from the group consisting of Cu, Au, Cr, Al, V and Ag, and the fourth non-magnetic layer 44 includes at least one selected from the group consisting of Ru, Ir, Ta, Rh, Pd, Pt and W. Alternatively, for example, the third non-magnetic layer 43 includes at least one selected from the group consisting of Ru, Ir, Ta, Rh, Pd, Pt and W, and the fourth non-magnetic layer 44 includes at least one selected from the group consisting of Cu, Au, Cr, Al, V and Ag. The fifth non-magnetic layer 45 includes, for example, at least one selected from the group consisting of Cu, Au, Cr, Al, V and Ag.

As shown in FIG. 1B, a thickness of the first non-magnetic layer 41 along the first direction D1 is defined as a first non-magnetic layer thickness t41. A thickness of the second non-magnetic layer 42 along the first direction D1 is defined as a second non-magnetic layer thickness t42. A thickness of the third non-magnetic layer 43 along the first direction D1 is defined as a third non-magnetic layer thickness t43. A thickness of the fourth non-magnetic layer 44 along the first direction D1 is defined as a fourth non-magnetic layer thickness t44. A thickness of the fifth non-magnetic layer 45 along the first direction D1 is defined as a fifth non-magnetic layer thickness t45.

In one example of the magnetic head 110, the first non-magnetic layer thickness t41 is, for example, not less than 2 nm and not more than 8 nm. The second non-magnetic layer thickness t42 is, for example, not less than 1 nm and not more than 5 nm. The third non-magnetic layer thickness t43 is, for example, not less than 1 nm and not more than 8 nm. The fourth non-magnetic layer thickness t44 is, for example, not less than 1 nm and not more than 8 nm. The fifth non-magnetic layer thickness t45 is, for example, not less than 1 nm and not more than 8 nm.

As shown in FIG. 1A, the first magnetic layer 21 has a face on a side of the second magnetic layer 22. A length of the face of the first magnetic layer 21 along the second direction D2 is defined as a third length L3. In embodiments, the third length L3 is longer than the second length L2. As shown in FIG. 1B, the first magnetic layer 21 has a face on a side of the second magnetic layer 22. A width of the face of the first magnetic layer 21 along the third direction D3 is defined as a third width w3. In embodiments, the third width w3 is wider than the second width w2. For example, the size of the first magnetic layer 21 is larger than the size of the second magnetic layer 22. For example, the resistance of the first magnetic layer 21 is lower than the resistance of the second magnetic layer 22.

Example of simulation results for the characteristics of the magnetic head 110 will be described below.

Figure 3:
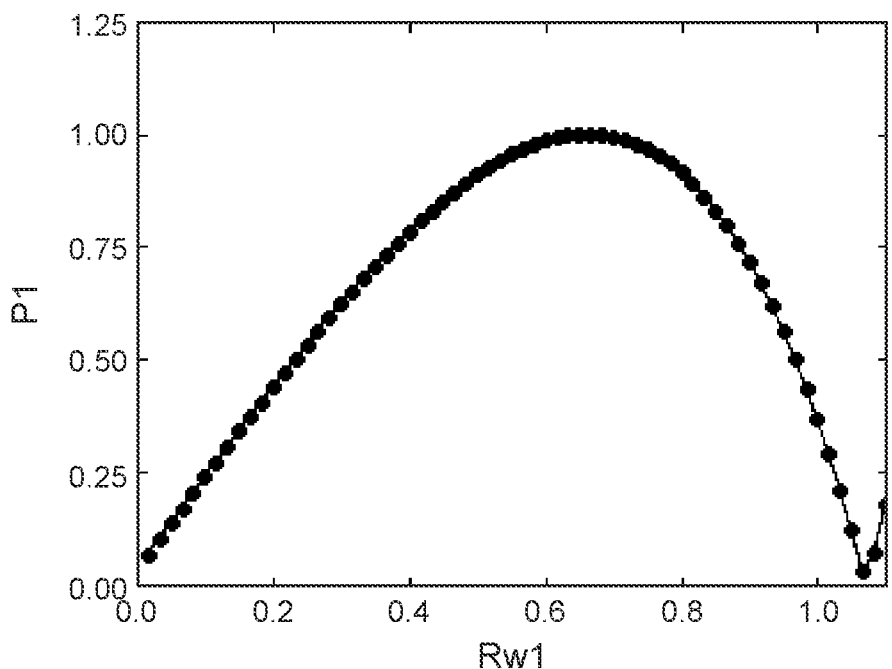
FIG. 3 is a graph illustrating characteristics of the magnetic head.

FIG. 3 is a graph illustrating characteristics of the magnetic head.

The horizontal axis of FIG. 3 is the width ratio Rw1. As already explained, the width ratio Rw1 is the ratio (w2/w1) of the second width w2 to the first width w1. The first width w1 is the width along the third direction D3 of the first face region r1. The second width w2 is the width along the third direction D3 of the second magnetic layer face 22F. The vertical axis in FIG. 3 is a parameter P1 relating to the magnitude of alternating resistance change in the second magnetic layer 22. The parameter P1 is normalized. When the parameter P1 is large, the alternating change in resistance in the second magnetic layer 22 is large. When the alternating change in resistance is large, alternating power accompanying the alternating change in resistance acts on the first magnetic layer 21. Thereby, the alternating magnetic field is efficiently generated from the first magnetic layer 21.

The simulation conditions are as follows. The first width w1 is 60 nm. The second width w2 is changed. The first length L1 is 50 nm. The second length L2 is 35 nm. The first thickness t1 is 5 nm. The second thickness t2 is 5 nm. The third thickness t3 is 2 nm. The fourth thickness t4 is 2 nm. The first non-magnetic layer thickness t41 is 4 nm. The second non-magnetic layer thickness t42 is 2 nm. The third non-magnetic layer thickness t43 is 2 nm. The fourth non-magnetic layer thickness t44 is 3 nm. The fifth non-magnetic layer thickness t45 is 2 nm.

As shown in FIG. 3, the parameter P1 of 0.5 or more is obtained when the width ratio Rw1 is not less than 0.25 and not more than 0.92 or less. In the embodiment, the width ratio Rw1 is preferably not less than 0.25 and not more than 0.92. When the width ratio Rw1 is not less than 0.25 and more than 0.92, the alternating power accompanying the resistance change increases. The alternating magnetic field is effectively generated by the action of the alternating power.

The width ratio Rw1 may be not less than 0.4 and not more than 0.85. The parameter P1 greater than or equal to 0.75 is obtained. The alternating magnetic field is generated more effectively.

The reason why a large parameter P1 is obtained when the width ratio Rw1 is not less than 0.25 and not more than 0.92 is considered to be caused by, for example, an increase in a component parallel to the second magnetic layer face 22F of the magnetic field applied to the second magnetic layer 22 from the first magnetic pole 31 and the second magnetic pole 32. It is considered that the alternating change of the resistances of the resistances in the second magnetic layer 22 at the interface becomes large. The interface is, for example, the second magnetic layer face 22F.

Figure 4:
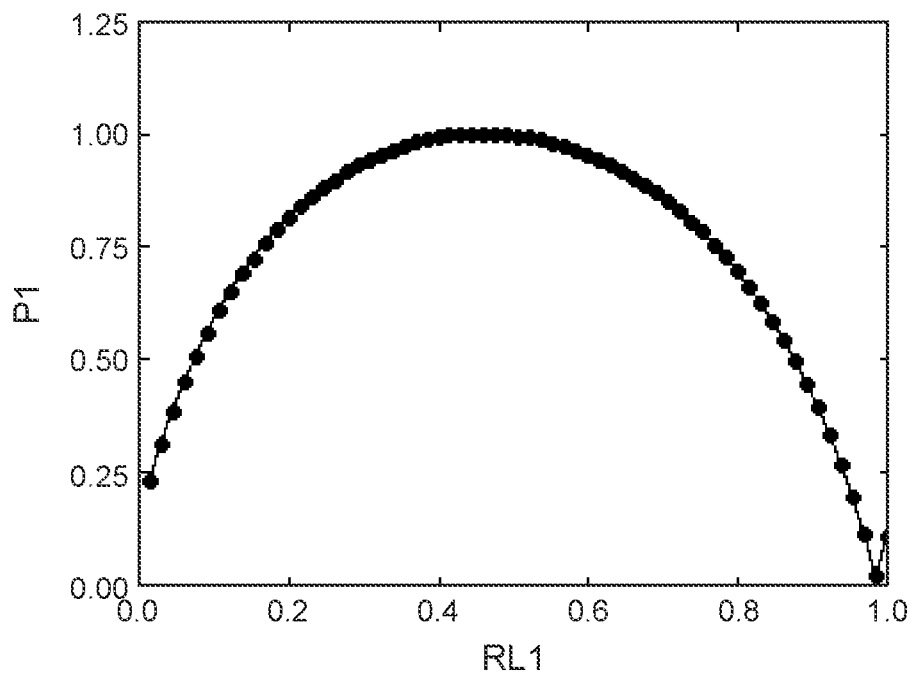
FIG. 4 is a graph illustrating characteristics of the magnetic head.

FIG. 4 is a graph illustrating characteristics of the magnetic head.

The horizontal axis of FIG. 4 is the length ratio RL1. As already explained, the length ratio RL1 is the ratio (L2/L1) of the second length L2 to the first length L1. The second length L2 is the length (height) along the second direction D2 of the second magnetic layer face 22F. The first length L1 is the length (height) along the second direction D2 between the crossing position 32p and the third face F3. The vertical axis in FIG. 4 is the parameter P1.

In the example of FIG. 4, the first width w1 is 60 nm. The second width w2 is 40 nm. The first length L1 is 50 nm. The second length L2 is changed. The first thickness t1 is 5 nm. The second thickness t2 is 5 nm. The third thickness t3 is 2 nm. The fourth thickness t4 is 2 nm. The first non-magnetic layer thickness t41 is 4 nm. The second non-magnetic layer thickness t42 is 2 nm. The third non-magnetic layer thickness t43 is 2 nm. The fourth non-magnetic layer thickness t44 is 3 nm. The fifth non-magnetic layer thickness t45 is 2 nm.

As shown in FIG. 4, the parameter P1 of 0.5 or more is obtained when the length ratio RL1 is not less than 0.1 and not more than 0.85. Thereby, the alternating power associated with the resistance change is increased. The alternating magnetic field is effectively generated by acting on the alternating power. In the embodiment, the length ratio RL1 is preferably not less than 0.1 and not more than 0.85. When the length ratio RL1 is not less than 0.1 and not more than 0.85, the alternating power accompanying resistance change increases. The alternating magnetic field is effectively generated by the action of the alternating power.

The length ratio RL1 may be not less than 0.2 and not more than 0.72. The parameter P1 greater than or equal to 0.75 is obtained. The alternating magnetic field is generated more effectively.

The reason why the large parameter P1 is obtained when the length ratio RL1 is not less than 0.1 and not more than 0.85 is considered to be caused by, for example, an increase in a component parallel to the second magnetic layer face 22F of the magnetic field applied from the first magnetic pole 31 and the second magnetic pole 32 to the second magnetic layer 22. For example, among the resistances in the second magnetic layer 22, it is considered that the alternating change of the resistance at the interface becomes large. The interface is, for example, the second magnetic layer face 22F. The reason why a larger parameter P1 is obtained when the length ratio RL1 is not less than 0.2 and not more than 0.7 is considered to be due to a further increase in a component parallel to the second magnetic layer face 22F of the magnetic field applied from the first magnetic pole 31 and the second magnetic pole 32 to the second magnetic layer 22.

Figure 5:
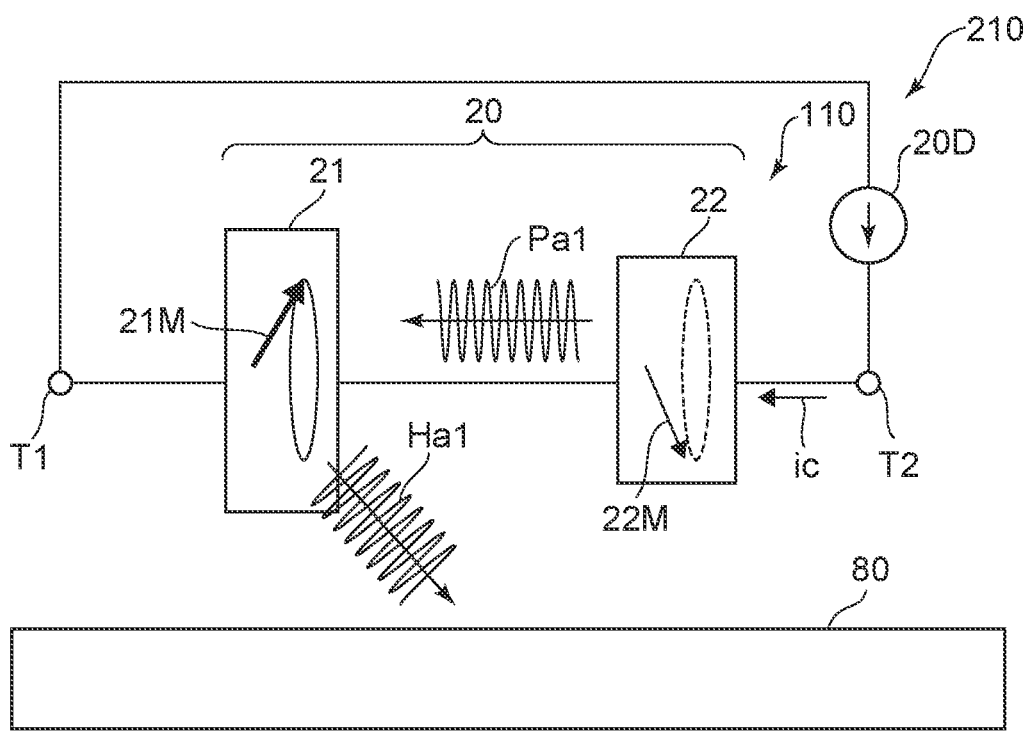
FIG. 5 is a schematic diagram illustrating the operation of the magnetic head in the first embodiment.

FIG. 5 is a schematic diagram illustrating the operation of the magnetic head in the first embodiment.

As shown in FIG. 5, the resistance between the first terminal T1 and the second terminal T2 changes alternately when the current ic of a threshold value or more flows through the stacked body 20. By the alternating resistance change, the alternating power Pa1 is generated. The alternating power Pa1 is applied (superimposed) to the current ic. For example, the magnetization 22M of the second magnetic layer 22 oscillates, and the resistance of the second magnetic layer 22 changes alternately. The magnetization 21M of the first magnetic layer 21 oscillates when the current ic of the threshold value or higher flows into the first magnetic layer 21. The alternating magnetic field Ha1 is generated from the first magnetic layer 21. The alternating power Pa1 based on the resistance change of the second magnetic layer 22 acts on the first magnetic layer 21. The frequency of the alternating magnetic field Ha1 can substantially match the frequency of the alternating power Pa1. For example, the alternating magnetic field Ha1 and the alternating electric power Pa1 are synchronized. For example, a current magnetic field may be generated by the alternating power Pa1, and the generated current magnetic field may be superimposed on the alternating magnetic field Ha1.

The alternating electric power Pa1 generated by the second magnetic layer 22 effectively acts on the first magnetic layer 21 to generate the alternating magnetic field Ha1 with high efficiency. For example, by the action of the alternating power Pa1, the oscillation of the magnetization 21M of the first magnetic layer 21 is stabilized, and the alternating magnetic field Ha1 is generated with high efficiency. By obtaining efficiently resistance change in the second magnetic layer 22, the alternating electric power Pa1 of high intensity can act on the first magnetic layer 21.

In the embodiment, the width ratio Rw1 is in an appropriate range to provide an efficient resistance change. When the length ratio RL1 is in an appropriate range, an efficient resistance change can be obtained.

Thus, in the magnetic head 110, for example, when the current ic flows through the stacked body 20, the alternating magnetic field Ha1 is generated from the stacked body 20, and the alternating power Pa1 is generated in the stacked body 20. For example, the absolute value of the difference between a first frequency of the alternating magnetic field Ha1 and a second frequency of the alternating power Pa1 is 0.25 times or less of the first frequency. The absolute value of the difference may be 0.1 times or less of the first frequency.

In one example, at least a part of the alternating power Pa1 is generated in the second magnetic layer 22. In one example, at least a part of the alternating magnetic field Ha1 is generated from the first magnetic layer 21. For example, it is considered that at least a part of the alternating power Pa1 is generated from the magnetic layer having a small size. For example, it is considered that at least a part of the alternating magnetic field Ha1 is generated from the magnetic layer having a large size.

The magnetic recording device 210 includes the magnetic head 110 and the electric circuit 20D. The magnetic head 110 includes the first magnetic pole 31, the second magnetic pole 32, and the stacked body 20. The stacked body 20 is provided between the first magnetic pole 31 and the second magnetic pole 32. The electric circuit 20D is configured to supply current to the stacked body 20. The stacked body 20 includes the first magnetic layer 21 and the second magnetic layer 22 provided between the first magnetic layer 21 and the second magnetic pole 32. When the current ic flows through the stacked body 20, the alternating magnetic field Ha1 is generated from the stacked body 20, and the alternating electric power Pa1 is generated in the stacked body 20.

In the magnetic recording device 210, the absolute value of the difference between the first frequency of the alternating magnetic field Ha1 and the second frequency of the alternating power Pa1 is 0.25 times or less of the first frequency. The absolute value of the difference may be 0.1 times or less of the first frequency. The first frequency is, for example, from 15 GHz to 50 GHz. The alternating magnetic field Ha1 of the first frequency is applied to the magnetic recording medium 80, and the MAMR is effectively performed.

Figure 6:
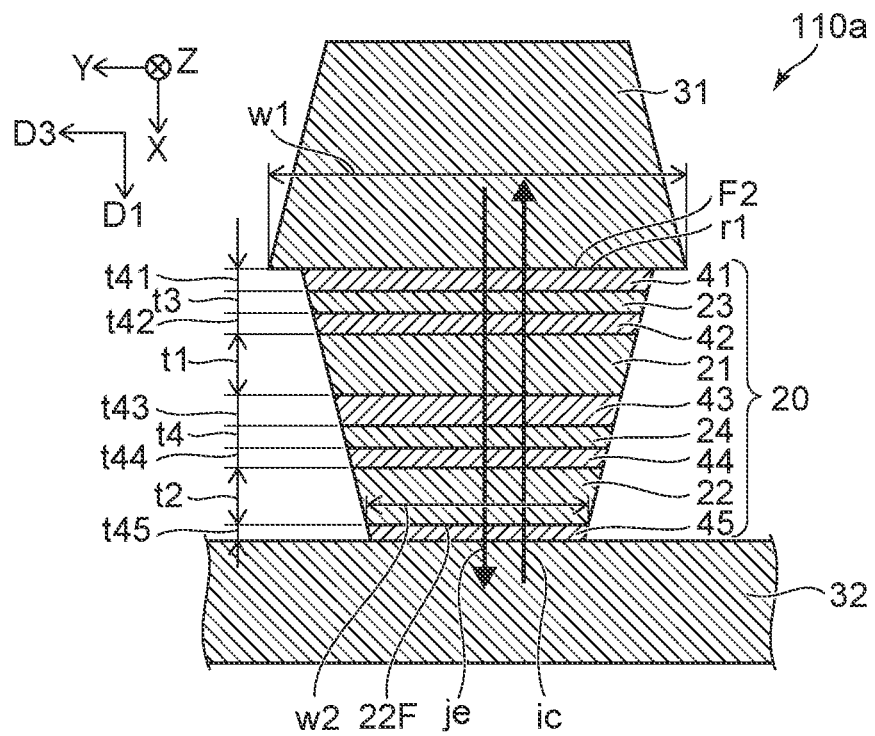
FIG. 6 is a schematic plan view illustrating magnetic heads according to the first embodiment.
Figure 7:
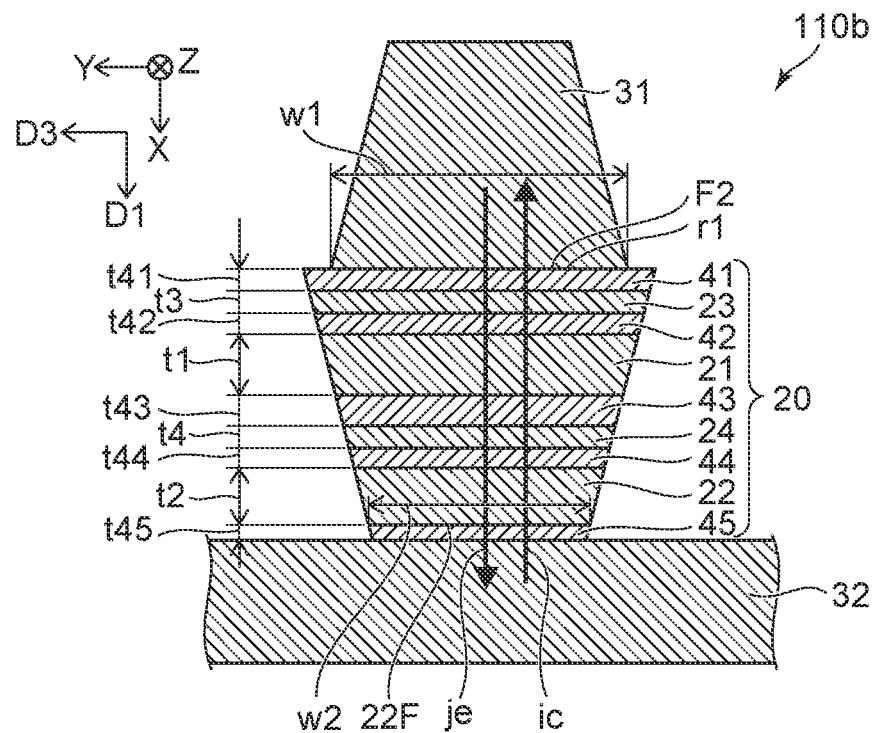
FIG. 7 is a schematic plan view illustrating magnetic heads according to the first embodiment.
Figure 8:
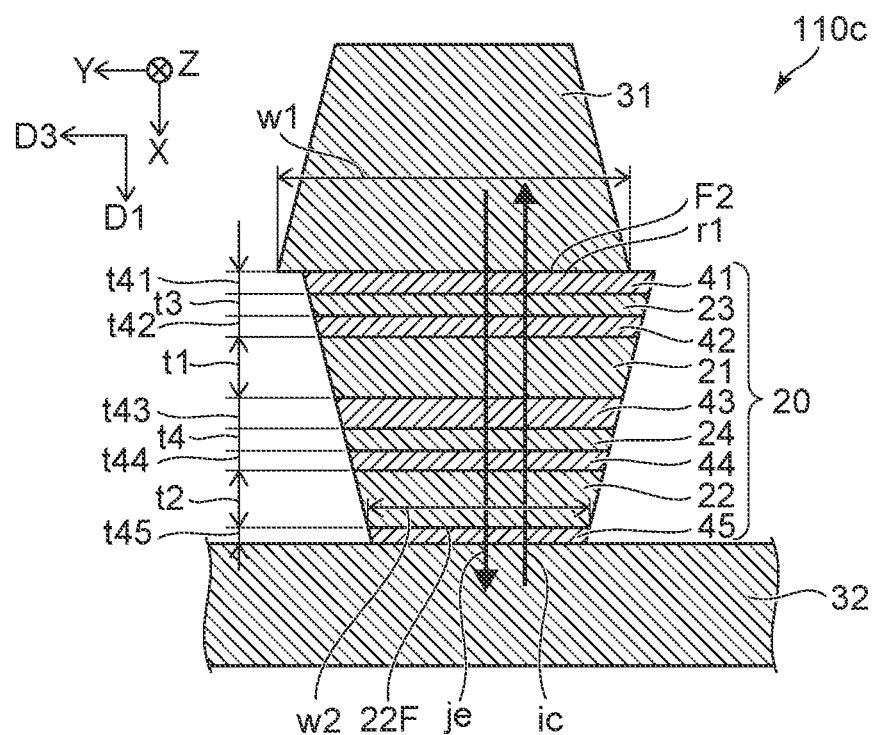
FIG. 8 is a schematic plan view illustrating magnetic heads according to the first embodiment.

FIGS. 6 to 8 are schematic plan views illustrating magnetic heads according to the first embodiment.

These are plan views viewed from arrow AR1 in FIG. 1A.

As shown in FIG. 6, in a magnetic head 110a according to the embodiment, the width (For example, the first width w1 of the first face region r1) of the first magnetic pole 31 may be wider than the width of the stacked body 20. The width of the stacked body 20 is, for example, the maximum length of the stacked body 20 in the third direction D3.

As shown in FIG. 7, in a magnetic head 110b according to the embodiment, the width (For example, the first width w1 of the first face region r1) of the first magnetic pole 31 may be smaller than the width of the stacked body 20. The width of the stacked body 20 is, for example, the maximum length of the stacked body 20 in the third direction D3.

As shown in FIG. 8, in a magnetic head 110c according to the embodiment, the position of the first magnetic pole 31 in the third direction D3 may be shifted from the position of the stacked body 20 in the third direction D3. The position of the first magnetic pole 31 in the third direction D3 may be, for example, a position of the center of the first magnetic pole 31 in the third direction D3. The position of the stacked body 20 in the third direction D3 may be, for example, a position of the center of the stacked body 20 in the third direction D3.

The configuration of the magnetic head 110a, the magnetic head 110b, and the magnetic head 110c other than the above may be the same as that of the magnetic head 110. A magnetic head capable of improving the recording density can be provided FIGS. 9A and 9B are schematic views illustrating the magnetic head according to the first embodiment.

Figure 9A:
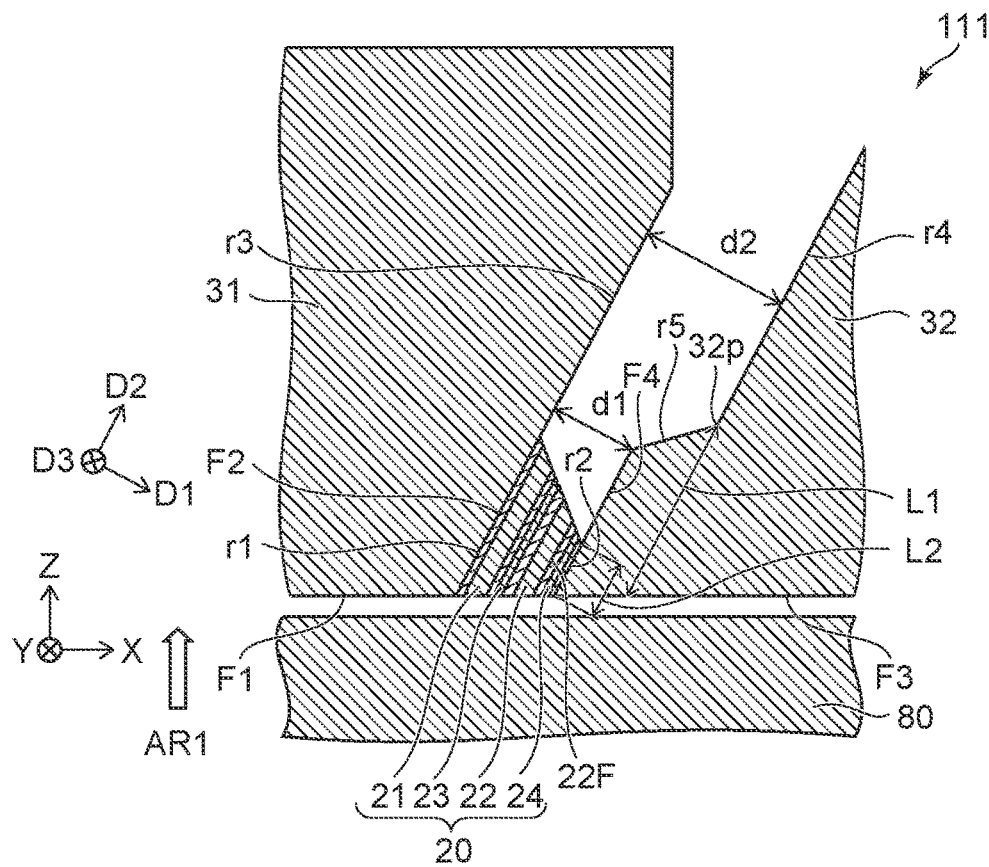
FIGS. 9A and 9B are schematic views illustrating the magnetic head according to the first embodiment.
Figure 9B:
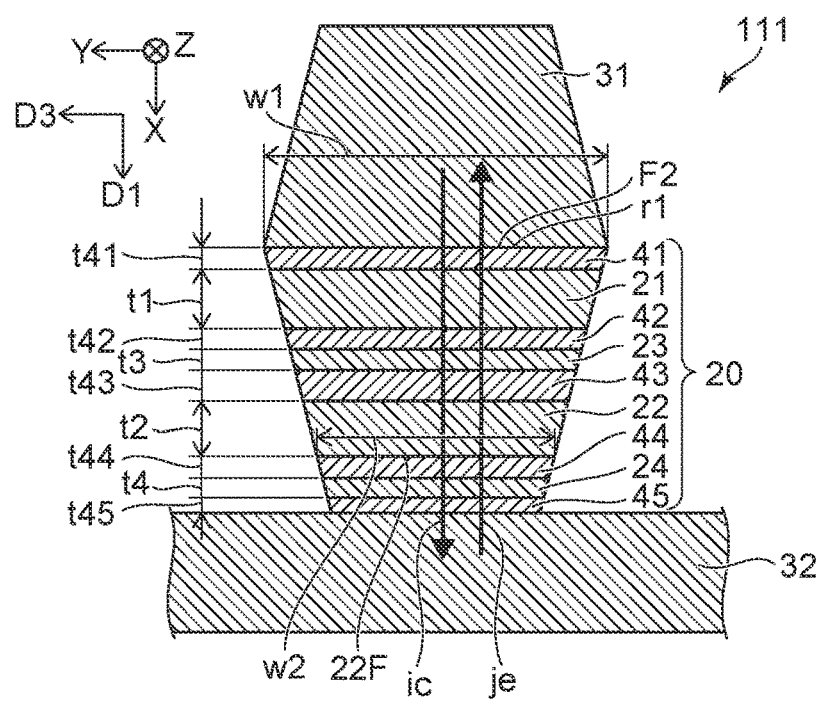

FIG. 9A is a cross-sectional view. FIG. 9B is a plan view seen from arrow AR1 in FIG. 9A. As shown in FIGS. 9A and 9B, a magnetic head 111 according to the embodiment also includes the first magnetic pole 31, the second magnetic pole 32 and the stacked body 20. The configuration of the stacked body 20 in the magnetic head 111 is different from the configuration of the stacked body 20 in the magnetic head 110. Except for this, the configuration of the magnetic head 111 may be the same as the configuration of the magnetic head 110.

In the magnetic head 111, the stacked body 20 includes the first magnetic layer 21, the second magnetic layer 22, the third magnetic layer 23, the fourth magnetic layer 24, the first non-magnetic layer 41, the second non-magnetic layer 42, the third non-magnetic layer 43, the fourth non-magnetic layer 44, and the fifth non-magnetic layer 45. The second magnetic layer 22 is provided between the first magnetic layer 21 and the second magnetic pole 32. The third magnetic layer 23 is provided between the first magnetic layer 21 and the second magnetic layer 22. The fourth magnetic layer 24 is provided between the second magnetic layer 22 and the second magnetic pole 32. The first non-magnetic layer 41 is provided between the first magnetic pole 31 and the first magnetic layer 21. The second non-magnetic layer 42 is provided between the first magnetic layer 21 and the third magnetic layer 23. The third non-magnetic layer 43 is provided between the third magnetic layer 23 and the second magnetic layer 22. The fourth non-magnetic layer 44 is provided between the second magnetic layer 22 and the fourth magnetic layer 24. The fifth non-magnetic layer 45 is provided between the fourth magnetic layer 24 and the second magnetic pole 32.

The first thickness t1 along the first direction D1 of the first magnetic layer 21 is thicker than the third thickness t3 along the first direction D1 of the third magnetic layer 23.

The second thickness t2 along the first direction D1 of the second magnetic layer 22 is thicker than the fourth thickness t4 along the first direction D1 of the fourth magnetic layer 24. The third thickness t3 is, for example, 0.75 times or less of the first thickness t1. The fourth thickness t4 is, for example, 0.7 times or less of the second thickness t2.

The magnetic head 111 also has the same characteristics as the magnetic head 110. For example, when the width ratio Rw1 is not less than 0.25 and not more than 0.92, the large parameter P1 is obtained. In the magnetic head 111, the width ratio Rv1 is preferably not less than 0.25 and not more than 0.92. The width ratio Rw1 may be not less than 0.4 and not more than 0.85. A high efficiency resistance change is obtained, and the alternating magnetic fields is generated more effectively.

Also in the magnetic head 111, a large parameter P1 is obtained when the length ratio RL1 is not less than 0.1 and not more than 0.85. Also in the magnetic head 111, the length ratio RL1 is preferably not less than 0.1 and not more than 0.85. The length ratio RL1 may be not less than 0.2 and not more than 0.72. High efficiency resistance change is obtained, and the alternating magnetic field is generated more effectively.

Efficient MAMR can also be performed in the magnetic head 111. According to the embodiments, it is possible to provide a magnetic head capable of improving the recording density.

In the magnetic head 111, the first non-magnetic layer 41 includes at least one selected from the group consisting of, for example, Cu, Au, Cr, Al, V and Ag. For example, the second non-magnetic layer 42 includes at least one selected from the group consisting of, for example, Ru, Ir, Ta, Rh, Pd, Pt, and W, and the third non-magnetic layer 43 includes at least one selected from the group consisting of, for example, Cu, Au, Cr, Al, V, and Ag. Alternatively, for example, the second non-magnetic layer 42 includes at least one selected from the group consisting of Cu, Au, Cr, Al, V, and Ag, and the third non-magnetic layer 43 includes at least one selected from the group consisting of Ru, Ir, Ta, Rh, Pd, Pt, and W. The fourth non-magnetic layer 44 includes, for example, at least one selected from the group consisting of Cu, Au, Cr, Al, V and Ag. The fifth non-magnetic layer 45 includes, for example, at least one selected from the group consisting of Ru, Ir, Ta, Rh, Pd, Pt, and W.

In one example of the magnetic head 111, the first non-magnetic layer thickness t41 is, for example, not less than 1 nm and not more than 8 nm. The second non-magnetic layer thickness t42 is, for example, not less than 1 nm and not more than 8 nm. The third non-magnetic layer thickness t43 is, for example, not less than 1 nm and not more than 8 nm. The fourth nonmagnetic layer thickness t44 is, for example, not less than 1 nm and not more than 5 nm. The fifth non-magnetic layer thickness t45 is, for example, not less than 2 nm and not more than 8 nm.

As shown in FIG. 9B, the current ic is supplied to the stacked body 20 in the magnetic head 111. For example, the current ic has an orientation from the first magnetic layer 21 to the second magnetic layer 22. The electron flow je has an orientation from the second magnetic layer 22 to the first magnetic layer 21.

Figure 10A:
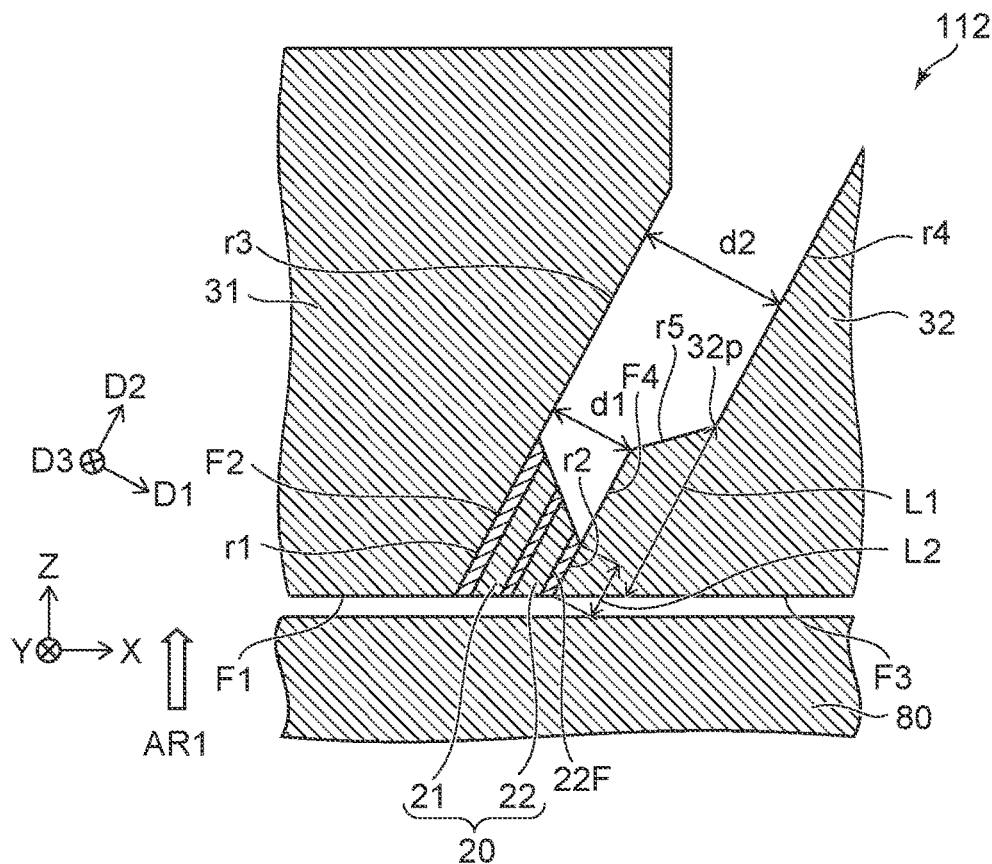
FIGS. 10A and 10B are schematic views illustrating the magnetic head according to the first embodiment.
Figure 10B:
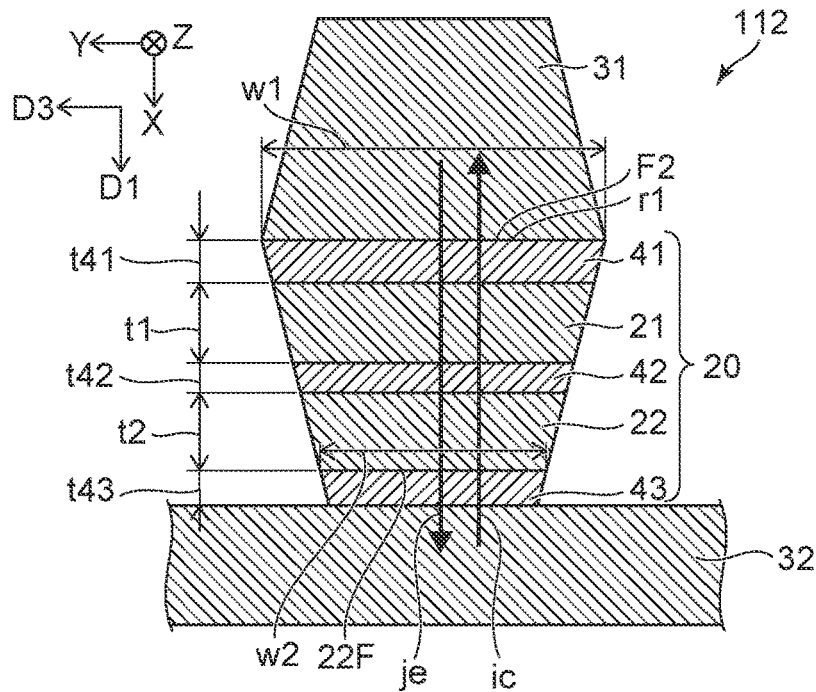

FIGS. 10A and 10B are schematic views illustrating the magnetic head according to the first embodiment.

FIG. 10A is a cross-sectional view. FIG. 10B is a plan view seen from arrow AR1 in FIG. 10A. As shown in FIGS. 10A and 10B, a magnetic head 112 according to the embodiment also includes the first magnetic pole 31, the second magnetic pole 32 and the stacked body 20. The configuration of the stacked body 20 in the magnetic head 112 is different from the configuration of the stacked body 20 in the magnetic head 110. Except for this, the configuration of the magnetic head 112 may be the same as the configuration of the magnetic head 110.

In magnetic head 112, the stacked body 20 includes the first non-magnetic layer 41. The first non-magnetic layer 41 is provided between the first magnetic pole 31 and the first magnetic layer 21. The first non-magnetic layer 41 includes at least one selected from the group consisting of Ru, Ir, Ta, Rh, Pd, Pt and W, for example.

In the magnetic head 112, the stacked body 20 may include a second non-magnetic layer 42. The second non-magnetic layer 42 is provided between the first magnetic layer 21 and the second magnetic layer 22. In one example, the second non-magnetic layer 42 includes at least one selected from the group consisting of Ru, Ir, Ta, Rh, Pd, Pt and W, for example. In another example, the second non-magnetic layer 42 may include at least one selected from the group consisting of Cu, Au, Cr, Al, V and Ag, for example.

In the magnetic head 112, the stacked body 20 may include the third non-magnetic layer 43. The third non-magnetic layer 43 is provided between the second magnetic layer 22 and the second magnetic pole 32. In one example, the third non-magnetic layer 43 includes at least one selected from the group consisting of Cu, Au, Cr, Al, V and Ag, for example. In another example, the third non-magnetic layer 43 may include at least one selected from the group consisting of Ru, Ir, Ta, Rh, Pd, Pt and W, for example.

The magnetic head 112 also has the same characteristics as the magnetic head 110. For example, when the width ratio Rw1 is not less than 0.25 and not more than 0.92, a high parameter P1 is obtained. In the magnetic head 111, the width ratio Rv1 is preferably not less than 0.25 and not more than 0.92. The width ratio Rw1 may be not less than 0.4 and not more than 0.85. High efficiency resistance change is obtained, and the alternating magnetic field is generated more effectively.

Also in the magnetic head 112, a high parameter P1 is obtained when the length ratio RL1 is not less than 0.1 and not more than 0.85. Also in the magnetic head 111, the length ratio RL1 is preferably not less than 0.1 and not more than 0.85. The length ratio RL1 may be not less than 0.2 and not more than 0.72. High efficiency resistance change is obtained, and the alternating magnetic field is generated more effectively.

Efficient MAMR can also be performed in the magnetic head 112. According to the embodiments, it is possible to provide a magnetic head capable of improving the recording density.

In one example of the magnetic head 112, the first non-magnetic layer thickness t41 is, for example, not less than 2 nm and not more than 8 nm. The second non-magnetic layer thickness t42 is, for example, not less than 1 nm and not more than to 8 nm. The third non-magnetic layer thickness t43 is, for example, not less than 1 nm and not more than 8 nm.

As shown in FIG. 10B, in one example of the magnetic head 112, the current ic has an orientation from the second magnetic layer 22 to the first magnetic layer 21. The electron flow je has an orientation from the first magnetic layer 21 to the second magnetic layer 22. In another example in the magnetic head 112, the current ic may have an orientation from the first magnetic layer 21 to the second magnetic layer 22.

In the magnetic head 112, for example, the first magnetic layer 21 can oscillate. The second magnetic layer 22 can oscillate.

In the magnetic head 111 and the magnetic head 112, for example, when the current ic flows through the stacked body 20, the alternating magnetic field Ha1 is generated from the stacked body 20, and the alternating power Pa1 is generated in the stacked body 20. For example, the absolute value of the difference between the first frequency of the alternating magnetic field Ha1 and the second frequency of the alternating power Pa1 is 0.25 times or less of the first frequency.

In the magnetic head 111 and the magnetic head 112, the configuration described with respect to the magnetic head 110 may be applied. For example, the third length L3 (see FIG. 1A) is longer than the second length L2. For example, the third width w3 (see FIG. 1B) is wider than the second width w2.

In the magnetic head 111 and the magnetic head 112, the structure described with respect to the magnetic head 110a, the magnetic head 110b and the magnetic head 110c may be applied.

In the following, an example of the magnetic head and the magnetic recording medium 80 included in the magnetic recording device 210 according to the embodiment will be described.

Figure 11:
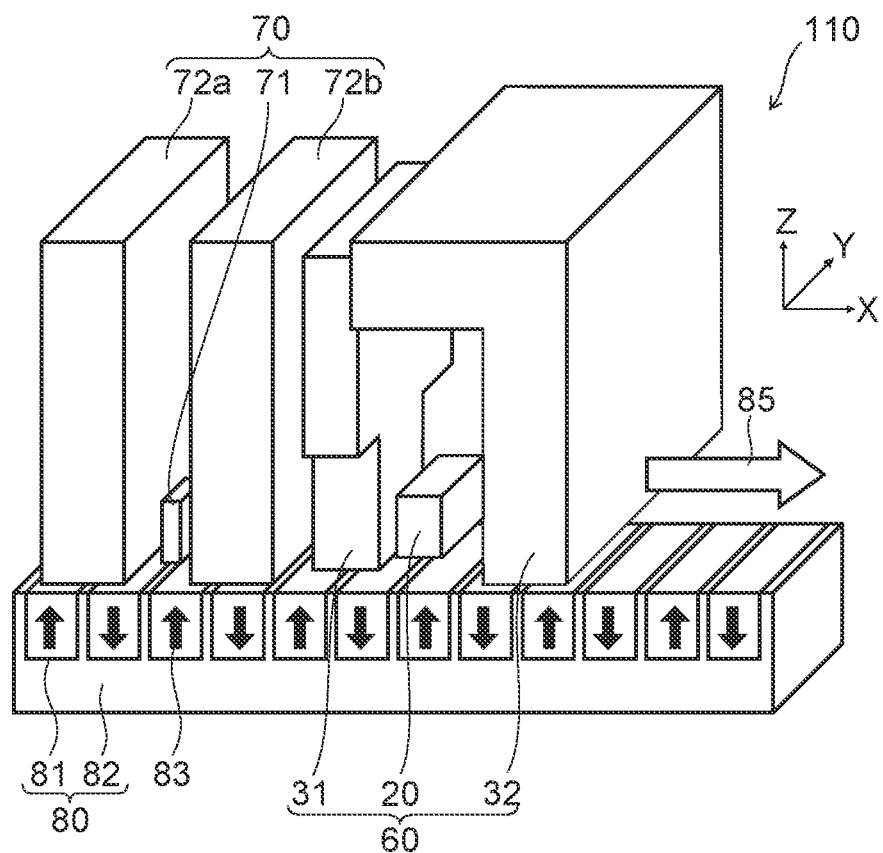
FIG. 11 is a schematic perspective view illustrating the magnetic recording device according to the embodiment.

FIG. 11 is a schematic perspective view illustrating the magnetic recording device according to the embodiment.

As shown in FIG. 11, the magnetic head according to the embodiment (for example, the magnetic head 110) is used together with the magnetic recording medium 80. In this example, the magnetic head 110 includes the recording part 60 and the reproducing part 70. Information is recorded on the magnetic recording medium 80 by the recording part 60 of the magnetic head 110. The reproducing part 70 reproduces the information recorded on the magnetic recording medium 80.

The magnetic recording medium 80 includes, for example, a medium substrate 82 and a magnetic recording layer 81 provided on the medium substrate 82. The magnetization 83 of the magnetic recording layer 81 is controlled by the recording part 60.

The reproducing part 70 includes, for example, a first reproducing magnetic shield 72a, a second reproducing magnetic shield 72b, and a magnetic reproducing element 71. The magnetic reproducing element 71 is provided between the first reproducing magnetic shield 72a and the second reproducing magnetic shield 72b. The magnetic reproducing element 71 is possible to output a signal corresponding to the magnetization 83 of the magnetic recording layer 81.

As shown in FIG. 11, the magnetic recording medium 80 moves relative to the magnetic head 110 in a direction of the medium movement direction 85. The magnetic head 110 controls the information corresponding to the magnetization 83 of the magnetic recording layer 81 at an arbitrary position. The magnetic head 110 reproduces information corresponding to the magnetization 83 of the magnetic recording layer 81 at an arbitrary position.

Figure 12:
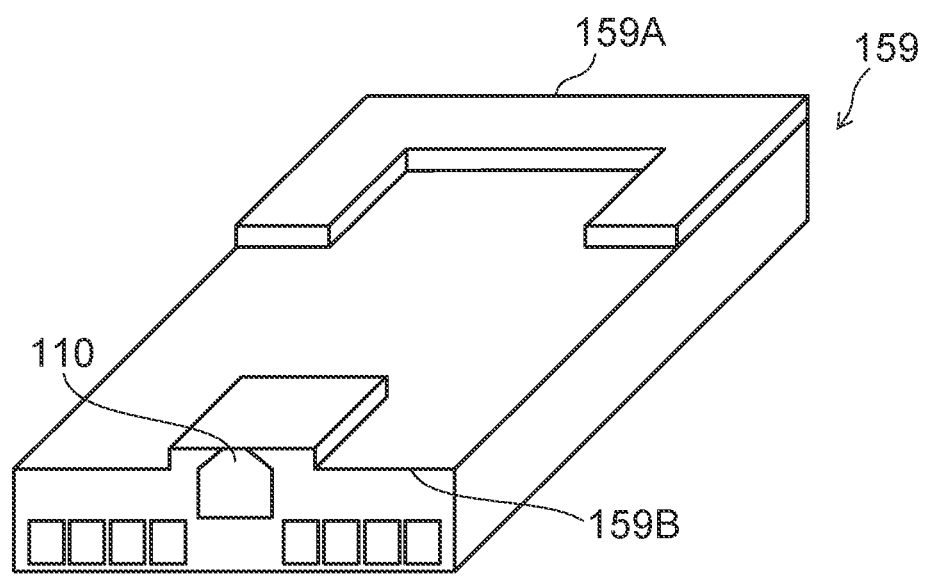
FIG. 12 is a schematic perspective view illustrating a portion of the magnetic recording device according to the embodiment.

FIG. 12 is a schematic perspective view illustrating a portion of the magnetic recording device according to the embodiment.

FIG. 12 illustrates a head slider.

The magnetic head 110 is provided on a head slider 159. The head slider 159 includes, for example, $Al_2O_3$/TiC and the like. The head slider 159 moves relative to the magnetic recording medium while floating or contacting the magnetic recording medium.

The head slider 159 includes, for example, an air inflow side 159A and an air outflow side 159B. The magnetic head 110 is arranged on the side surface of the air outflow side 159B of the head slider 159. As a result, the magnetic head 110 moves relative to the magnetic recording medium while floating or contacting the magnetic recording medium.

Figure 13:
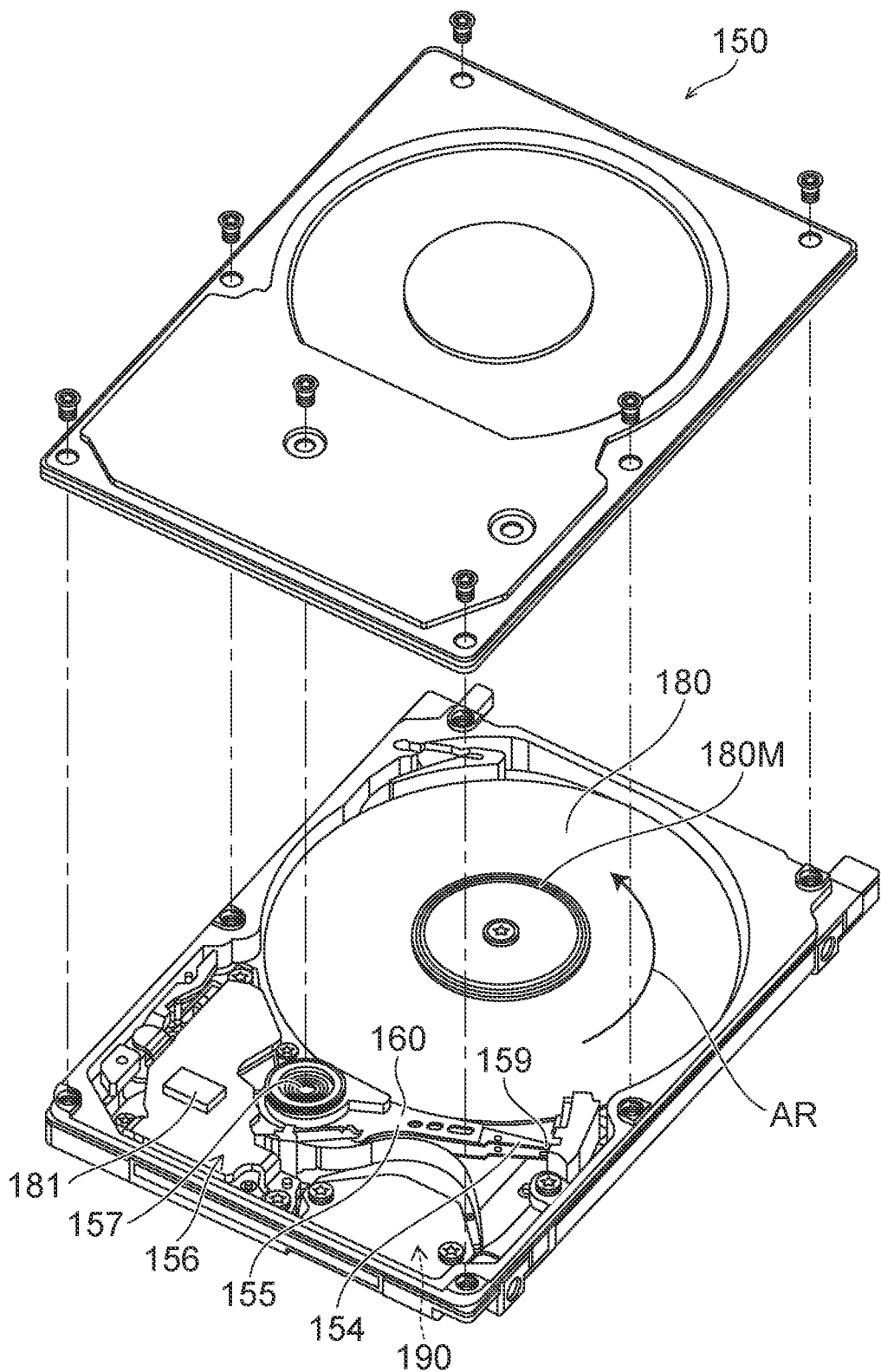
FIG. 13 is a schematic perspective view illustrating a magnetic recording device according to the embodiment.

FIG. 13 is a schematic perspective view illustrating a magnetic recording device according to the embodiment.

As shown in FIG. 13, in the magnetic recording device 150 according to the embodiment, a rotary actuator is used. A recording medium disk 180 is mounted on a spindle motor 180M. The recording medium disk 180 is rotated in the direction of an arrow AR by the spindle motor 180M. The spindle motor 180M responds to a control signal from the drive device controller. The magnetic recording device 150 according to the embodiment may include multiple recording medium disks 180. The magnetic recording device 150 may include a recording medium 181. The recording medium 181 is, for example, an SSD (Solid State Drive). As the recording medium 181, for example, a non-volatile memory such as a flash memory is used. For example, the magnetic recording device 150 may be a hybrid HDD (Hard Disk Drive).

The head slider 159 records and reproduces the information to be recorded on the recording medium disk 180. The head slider 159 is provided at the tip of the thin film suspension 154. A magnetic head according to the embodiment is provided near the tip of the head slider 159.

When the recording medium disk 180 rotates, the pressing pressure by a suspension 154 and the pressure generated on the medium facing surface (ABS) of the head slider 159 are balanced. The distance between the media facing surface of the head slider 159 and the surface of the recording medium disk 180 is a predetermined fly height. In the embodiment, the head slider 159 may contact the recording medium disk 180. For example, a contact-sliding type may be applied.

The suspension 154 is connected to one end of an arm 155 (e.g., an actuator arm). The arm 155 includes, for example, a bobbin portion and the like. The bobbin portion holds a drive coil. A voice coil motor 156 is provided at the other end of the arm 155. The voice coil motor 156 is a kind of linear motor. The voice coil motor 156 includes, for example, a drive coil and a magnetic circuit. The drive coil is wound around the bobbin portion of the arm 155. The magnetic circuit includes a permanent magnet and an opposed yoke. A drive coil is provided between the permanent magnet and the opposing yoke. The suspension 154 has one end and the other end. The magnetic head is provided at one end of the suspension 154. The arm 155 is connected to the other end of the suspension 154.

The arm 155 is held by a ball bearing. Ball bearings are provided at two locations above and below the bearing part 157. The arm 155 can be rotated and slid by the voice coil motor 156. The magnetic head can be moved to an arbitrary position on the recording medium disk 180.

Figure 14A:
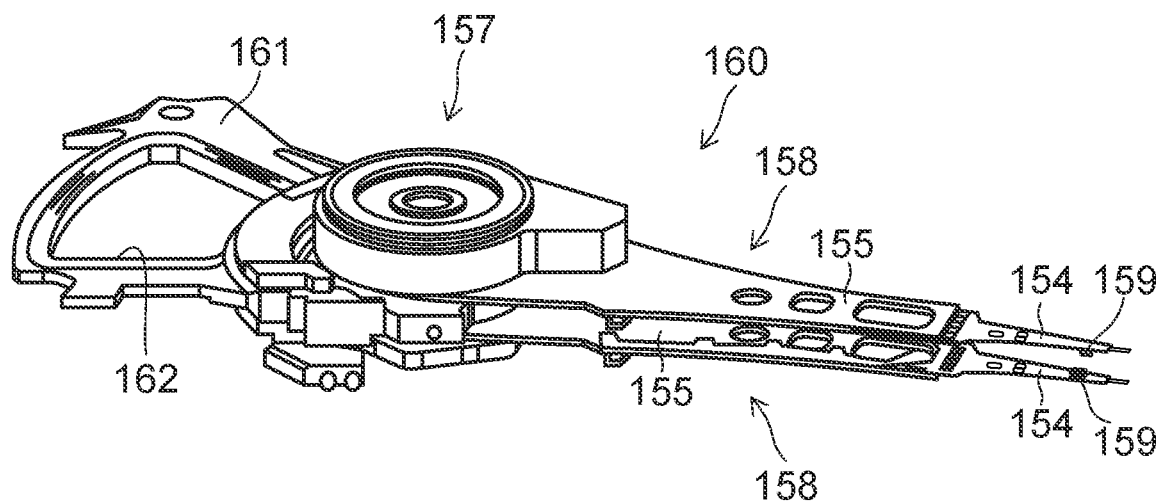
FIGS. 14A and 14B are schematic perspective views illustrating a portion of the magnetic recording device according to the embodiment.
Figure 14B:
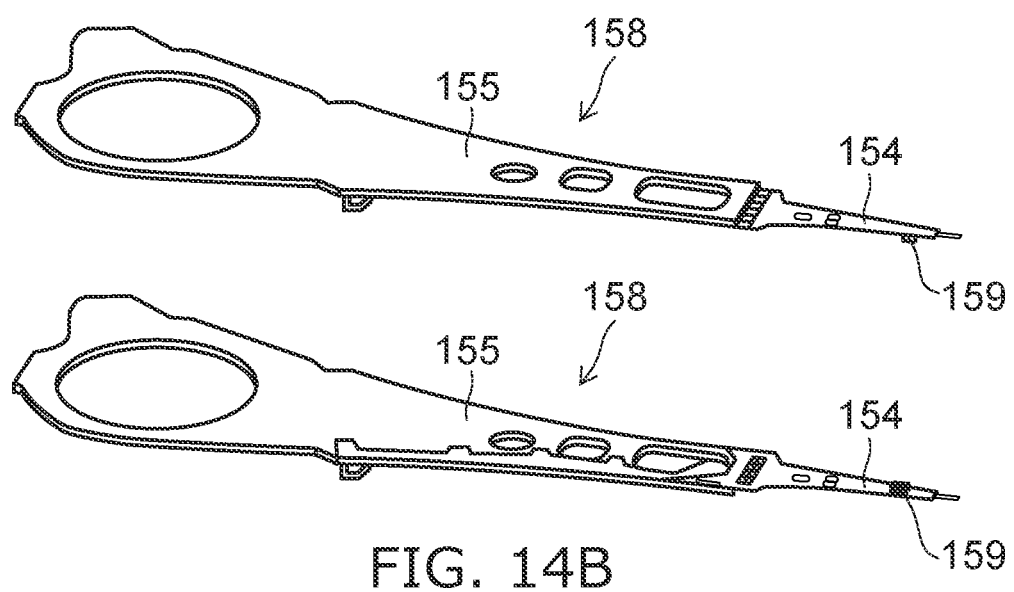

FIGS. 14A and 14B are schematic perspective views illustrating a portion of the magnetic recording device according to the embodiment.

FIG. 14A illustrates a partial configuration of the magnetic recording device and is an enlarged perspective view of a head stack assembly 160. FIG. 14B is a perspective view illustrating a magnetic head assembly (head gimbal assembly: HGA) 158 that is a portion of the head stack assembly 160.

As shown in FIG. 14A, the head stack assembly 160 includes the bearing part 157, the head gimbal assembly 158, and a support frame 161. The head gimbal assembly 158 extends from the bearing part 157. The support frame 161 extends from the bearing part 157. The extending direction of the support frame 161 is opposite to the extending direction of the head gimbal assembly 158. The support frame 161 supports a coil 162 of the voice coil motor 156.

As shown in FIG. 14B, the head gimbal assembly 158 includes the arm 155 extending from the bearing part 157 and the suspension 154 extending from the arm 155.

The head slider 159 is provided at the tip of the suspension 154. The head slider 159 is provided with the magnetic head according to the embodiment.

The magnetic head assembly (head gimbal assembly) 158 according to the embodiment includes the magnetic head according to the embodiment, the head slider 159 provided with the magnetic head, the suspension 154, and the arm 155. The head slider 159 is provided at one end of the suspension 154. The arm 155 is connected to the other end of the suspension 154. The suspension 154 includes, for example, lead wires (not shown) for recording and reproducing signals. The suspension 154 may include, for example, a lead wire (not shown) for a heater for adjusting the fly height. The suspension 154 may include, for example, a lead wire (not shown) for a spin transfer torque oscillator. These lead wires and multiple electrodes provided on the magnetic head are electrically connected.

The magnetic recording device 150 is provided with a signal processor 190. The signal processor 190 records and reproduces a signal on a magnetic recording medium using a magnetic head. The input/output lines of the signal processor 190 are connected to, for example, the electrode pads of the head gimbal assembly 158, and are electrically connected to the magnetic head.

The magnetic recording device 150 according to the embodiment includes the magnetic recording medium, the magnetic head according to the embodiment, a movable part, a position controller, and the signal processor. The movable part is relatively movable in a state where the magnetic recording medium and the magnetic head are separated or brought into contact with each other. The position controller aligns the magnetic head with a predetermined recording position on the magnetic recording medium. The signal processor records and reproduces a signal on a magnetic recording medium using a magnetic head.

For example, as the above-mentioned magnetic recording medium, the recording medium disk 180 is used. The movable part includes, for example, the head slider 159. The position controller includes, for example, the head gimbal assembly 158.

The embodiment may include the following configurations (e.g., technical proposals).

Configuration 1

A magnetic head, comprising:
  a first magnetic pole, the first magnetic pole including a first face and a second face crossing the first face, the second face including a first face region continuous with the first face;
  a second magnetic pole, the second magnetic pole including a third face and a fourth face crossing the third face, the fourth face including a second face region, the second face region being continuous with the third face, a direction from the first face region to the second face region being along a first direction, the first face region and the second face region being along a second direction and a third direction, the third direction crossing a plane including the first direction and the second direction, the first face and the third face being along the third direction; and
  a stacked body provided between the first face region and the second face region, the stacked body including
    a first magnetic layer, and
    a second magnetic layer provided between the first magnetic layer and the second face region,
  the second magnetic layer including a second magnetic layer face facing the second face region, and
  a width ratio of a second width of the second magnetic layer face along the third direction to a first width of the first face region along the third direction being not less than 0.25 and not more than 0.92.

Configuration 2

The magnetic head according to Configuration 1, wherein the width ratio is not less than 0.4 and not more than to 0.85.

Configuration 3

The magnetic head according to Configuration 1 or 2, wherein
  the second face further includes a third face region,
  the second face further includes a third face region,
  the first face region is between the first face and the third face region,
  the third face region is along the second direction and the third direction,
  the fourth face further includes a fourth face region and a fifth face region,
  a direction from the third face region to the fourth face region is along the first direction,
  the fourth face region is along the second direction and the third direction,
  a first distance between the first face region and the second face region along the first direction is shorter than a second distance between the third face region and the fourth face region along the first direction,
  the fifth face region is between the second face region and the fourth face region,
  a plane including the fifth face region crosses a plane including the third face region and a plane including the fourth face region,
  the second magnetic pole has a first length along the second direction between a crossing position and the third face, the plane including the fifth face region crossing the plane including the fourth face region at the crossing position, and
  a length ratio of a second length of the second magnetic layer face along the second direction to the first length is not less than 0.1 and not more than 0.85.

Configuration 4

The magnetic head according to Configuration 3, wherein the length ratio is not less than 0.2 and not more than to 0.72.

Configuration 5

The magnetic head according to any one of Configurations 1 to 4, wherein the second direction is inclined with respect to the first direction.

Configuration 6

A magnetic head, comprising:
  a first magnetic pole, the first magnetic pole including a first face and a second face crossing the first face, the second face including a first face region continuous with the first face;
  a second magnetic pole, the second magnetic pole including a third face and a fourth face crossing the third face, the fourth face including a second face region, the second face region being continuous with the third face, a direction from the first face region to the second face region being along a first direction, the first face region and the second face region being along a second direction and a third direction, the third direction crossing a plane including the first direction and the second direction, the first face and the third face being along the third direction; and a stacked body provided between the first face region and the second face region, the stacked body including
a first magnetic layer, and
a second magnetic layer provided between the first magnetic layer and the second face region, the second magnetic layer including a second magnetic layer face facing the second face region, the second face further including a third face region, the first face region being between the first face and the third face region, The third face region being along the second direction and the third direction, the fourth face further including a fourth face region and a fifth face region, a direction from the third surface region to the fourth surface region being along the first direction, the fourth face region being along the second direction and the third direction, a first distance between the first face region and the second face region along the first direction being shorter than a second distance between the third face region and the fourth face region along the first direction, the fifth surface region being between the second face region and the fourth face region, a plane including the fifth face region crossing a plane including the third plane region and a plane including the fourth plane region, the second magnetic pole having a first length along the second direction between a crossing position and the third face, the plane including the fifth face region crossing the plane including the fourth surface region at the crossing position, and a ratio of a second length of the second magnetic layer face along the second direction to the first length being not less than 0.1 and not more than 0.85.

Configuration 7

The magnetic head according to Configuration 6, wherein the length ratio is not less than 0.2 and not more than to 0.72.

Configuration 8

The magnetic head according to Configuration 6, wherein the second direction is inclined with respect to the first direction.

Configuration 9

The magnetic head according to any one of Configurations 1 to 8, wherein the stacked body further includes a first non-magnetic layer provided between the first magnetic layer and the second magnetic layer.

Configuration 10

The magnetic head according to Configuration 9, wherein the stacked body further includes a second non-magnetic layer provided between the first magnetic pole and the first magnetic layer.

Configuration 11

The magnetic head according to Configuration 10, wherein the stacked body includes a third non-magnetic layer provided between the second magnetic layer and the second magnetic pole.

Configuration 12

The magnetic head according to any one of Configurations 1 to 8, wherein
the stacked body further includes
a third magnetic layer provided between the first magnetic pole and the first magnetic layer,
a fourth magnetic layer provided between the first magnetic layer and the second magnetic layer,
a first non-magnetic layer provided between the first magnetic pole and the third magnetic layer,
a second non-magnetic layer provided between the third magnetic layer and the first magnetic layer,
a third non-magnetic layer provided between the first magnetic layer and the fourth magnetic layer,
a fourth non-magnetic layer provided between the fourth magnetic layer and the second magnetic layer, and
a fifth non-magnetic layer provided between the second magnetic layer and the second magnetic pole,
a first thickness along the first direction of the first magnetic layer is thicker than a third thickness along the first direction of the third magnetic layer, and
a second thickness of the second magnetic layer along the first direction is thicker than the fourth thickness of the fourth magnetic layer along the first direction.

Configuration 13

The magnetic head according to Configuration 12, wherein the first non-magnetic layer includes at least one selected from the group consisting of Ru, Ir, Ta, Rh, Pd, Pt, and W,
the second non-magnetic layer includes at least one selected from the group consisting of Cu, Au, Cr, Al, V and Ag,
the fifth non-magnetic layer includes at least one selected from the group consisting of Cu, Au, Cr, Al, V and Ag, and
the third nonmagnetic layer includes at least one selected from the group consisting of Cu, Au, Cr, Al, V and Ag, and the fourth non-magnetic layer includes at least one selected from the group consisting of Ru, Ir, Ta, Rh, Pd, Pt and W, or the third non-magnetic layer includes at least one selected from the group consisting of Ru, Ir, Ta, Rh, Pd, Pt and W, and the fourth nonmagnetic layer includes at least one selected from the group consisting of Cu, Au, Cr, Al, V and Ag.

Configuration 14

The magnetic head according to any one of Configurations 1 to 8, wherein
the stacked body further includes
a third magnetic layer provided between the first magnetic layer and the second magnetic layer,
a fourth magnetic layer provided between the second magnetic layer and the second magnetic pole,
a first non-magnetic layer provided between the first magnetic pole and the first magnetic layer,
a second non-magnetic layer provided between the first magnetic layer and the third magnetic layer,
a third non-magnetic layer provided between the third magnetic layer and the second magnetic layer,
a fourth non-magnetic layer provided between the second magnetic layer and the fourth magnetic layer, and
a fifth non-magnetic layer provided between the fourth magnetic layer and the second magnetic pole,
a first thickness along the first direction of the first magnetic layer is thicker than a third thickness along the first direction of the third magnetic layer, and a second thickness along the first direction of the second magnetic layer is thicker than a fourth thickness along the first direction of the fourth magnetic layer.

Configuration 15

The magnetic head according to Configuration 14, wherein
the first non-magnetic layer includes at least one selected from the group consisting of Cu, Au, Cr, Al, V and Ag,
the fourth non-magnetic layer includes at least one selected from the group consisting of Cu, Au, Cr, Al, V and Ag,
the fifth non-magnetic layer includes at least one selected from the group consisting of Ru, Ir, Ta, Rh, Pd, Pt, and W, and
the second non-magnetic layer includes at least one selected from the group consisting of Ru, Ir, Ta, Rh, Pd, Pt and W, and the third non-magnetic layer includes at least one selected from the group consisting of Cu, Au, Cr, Al, V and Ag, or the second non-magnetic layer includes at least one selected from the group consisting of Cu, Au, Cr, Al, V and Ag, and the third non-magnetic layer includes at least one selected from the group consisting of Ru, Ir, Ta, Rh, Pd, Pt and W.

Configuration 16

The magnetic head according to any one of Configurations 12 to 15, wherein
when a current flows through the stacked body, an alternating magnetic field is generated from the stacked body, the alternating power is generated in the stacked body, and
an absolute value of a difference between a first frequency of the alternating magnetic field and a second frequency of the alternating power is 0.25 times or less of the first frequency.

Configuration 17

The magnetic head according to Configuration 16, wherein the first thickness is thicker than the second thickness,
at least a part of the alternating power is generated in the second magnetic layer, and
at least a part of the alternating magnetic field is generated from the first magnetic layer.

Configuration 18

A magnetic recording device, comprising:
a magnetic head including a first magnetic pole, a second magnetic pole, and a stacked body provided between the first magnetic pole and the second magnetic pole; and
an electric circuit configured to supply a current to the stacked body,
the stacked body including,
a first magnetic layer, and
a second magnetic layer provided between the first magnetic layer and the second magnetic pole,
wherein the alternating power is configured to be generated in the stacked body when the current flows through the stacked body.

Configuration 19

The magnetic recording device according to Configuration 18, wherein
when the current flows through the stacked body, an alternating magnetic field is generated from the stacked body, and
an absolute value of a difference between a first frequency of the alternating magnetic field and a second frequency of the alternating power is 0.25 times or less of the first frequency.

Configuration 20

The magnetic recording device according to Configuration 19, wherein the first frequency is not less than 15 GHz and not more than 50 GHz.

According to the embodiment, a magnetic head and a magnetic recording device can be provided in which the recording density is possible to be improved.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads such as magnetic poles, stacked bodies, magnetic layers, non-magnetic layers, wirings, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads, and magnetic recording devices practicable by an appropriate design modification by one skilled in the art based on the magnetic heads, and the magnetic recording devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic head, comprising:
a first magnetic pole, the first magnetic pole including a first face and a second face crossing the first face, the second face including a first face region continuous with the first face;
a second magnetic pole, the second magnetic pole including a third face and a fourth face crossing the third face, the fourth face including a second face region, the second face region being continuous with the third face, a direction from the first face region to the second face region being along a first direction, the first face region and the second face region being along a second direction and a third direction, the third direction crossing a plane including the first direction and the second direction, the first face and the third face being along the third direction; and a stacked body provided between the first face region and the second face region,
the stacked body including
a first magnetic layer, and
a second magnetic layer provided between the first magnetic layer and the second face region,
the second magnetic layer including a second magnetic layer face facing the second face region, and
a width ratio of a second width of the second magnetic layer face along the third direction to a first width of the first face region along the third direction being not less than 0.25 and not more than 0.92,
wherein the stacked body further includes
a third magnetic layer provided between the first magnetic pole and the first magnetic layer
a fourth magnetic layer provided between the first magnetic layer and the second magnetic layer,
a first non-magnetic layer provided between the first magnetic pole and the third magnetic layer,
a second non-magnetic layer provided between the third magnetic layer and the first magnetic layer,
a third non-magnetic layer provided between the first magnetic layer and the fourth magnetic layer,
a fourth non-magnetic layer provided between the fourth magnetic layer and the second magnetic layer, and
a fifth non-magnetic layer provided between the second magnetic layer and the second magnetic pole.

2. The head according to claim 1, wherein the width ratio is not less than 0.4 and not more than to 0.85.

3. The head according to claim 1, wherein
the second face further includes a third face region,
the first face region is between the first face and the third face region,
the third face region is along the second direction and the third direction,
the fourth face further includes a fourth face region and a fifth face region,
a direction from the third face region to the fourth face region is along the first direction,
the fourth face region is along the second direction and the third direction,
a first distance between the first face region and the second face region along the first direction is shorter than a second distance between the third face region and the fourth face region along the first direction,
the fifth face region is between the second face region and the fourth face region, a plane including the fifth face region crosses a plane including the third face region and a plane including the fourth face region,
the second magnetic pole has a first length along the second direction between a crossing position and the third face, the plane including the fifth face region crossing the plane including the fourth face region at the crossing position, and
a length ratio of a second length of the second magnetic layer face along the second direction to the first length is not less than 0.1 and not more than 0.85.

4. The head according to claim 3, wherein the length ratio is not less than 0.2 and not more than to 0.72.

5. The head according to claim 1, wherein the second direction is inclined with respect to the first direction.

6. The head according to claim 1, wherein
a first thickness of the first magnetic layer along the first direction is thicker than a third thickness of the third magnetic layer along the first direction, and
a second thickness of the second magnetic layer along the first direction is thicker than a fourth thickness of the fourth magnetic layer along the first direction.

7. The head according to claim 6, wherein
when a current flows through the stacked body, an alternating magnetic field is generated from the stacked body, alternating power is generated in the stacked body, and
an absolute value of a difference between a first frequency of the alternating magnetic field and a second frequency of the alternating power is 0.25 times or less of the first frequency.

8. The head according to claim 7, wherein
the first thickness is thicker than the second thickness,
at least a part of the alternating power is generated in the second magnetic layer, and
at least a part of the alternating magnetic field is generated from the first magnetic layer.

9. The head according to claim 1, wherein
the first non-magnetic layer includes at least one selected from the group consisting of Ru, Ir, Ta, Rh, Pd, Pt, and W,
the second non-magnetic layer includes at least one selected from the group consisting of Cu, Au, Cr, Al, V and Ag,
the fifth non-magnetic layer includes at least one selected from the group consisting of Cu, Au, Cr, Al, V and Ag, and
the third nonmagnetic layer includes at least one selected from the group consisting of Cu, Au, Cr, Al, V and Ag, and the fourth non-magnetic layer includes at least one selected from the group consisting of Ru, Ir, Ta, Rh, Pd, Pt and W, or the third non-magnetic layer includes at least one selected from the group consisting of Ru, Ir, Ta, Rh, Pd, Pt and W, and the fourth nonmagnetic layer includes at least one selected from the group consisting of Cu, Au, Cr, Al, V and Ag.

10. A magnetic recording device, comprising:
a magnetic head according to claim 1.

11. A magnetic head, comprising:
a first magnetic pole, the first magnetic pole including a first face and a second face crossing the first face, the second face including a first face region continuous with the first face;
a second magnetic pole, the second magnetic pole including a third face and a fourth face crossing the third face, the fourth face including a second face region, the second face region being continuous with the third face, a direction from the first face region to the second face region being along a first direction, the first face region and the second face region being along a second direction and a third direction, the third direction crossing a plane including the first direction and the second direction, the first face and the third face being along the third direction; and
a stacked body provided between the first face region and the second face region,
the stacked body including
a first magnetic layer, and
a second magnetic layer provided between the first magnetic layer and the second face region,
the second magnetic layer including a second magnetic layer face facing the second face region,
the second face further including a third face region,
the first face region being between the first face and the third face region, the third face region being along the second direction and the third direction, the fourth face further including a fourth face region and a fifth face region, a direction from the third face region to the fourth face region being along the first direction, the fourth face region being along the second direction and the third direction, a first distance between the first face region and the second face region along the first direction being shorter than a second distance between the third face region and the fourth face region along the first direction, the fifth face region being between the second face region and the fourth face region, a plane including the fifth face region crossing a plane including the third face region and a plane including the fourth face region, the second magnetic pole having a first length along the second direction between a crossing position and the third face, the plane including the fifth face region crossing the plane including the fourth face region at the crossing position, and a ratio of a second length of the second magnetic layer face along the second direction to the first length being not less than 0.1 and not more than 0.85, wherein the stacked body further includes a third magnetic layer provided between the first magnetic pole and the first magnetic layer, a fourth magnetic layer provided between the first magnetic layer and the second magnetic layer, a first non-magnetic layer provided between the first magnetic pole and the third magnetic layer, a second non-magnetic layer provided between the third magnetic layer and the first magnetic layer, a third non-magnetic layer provided between the first magnetic layer and the fourth magnetic layer, a fourth non-magnetic layer provided between the fourth magnetic layer and the second magnetic layer, and a fifth non-magnetic layer provided between the second magnetic layer and the second magnetic pole.

12. The head according to claim 11, wherein the length ratio is not less than 0.2 and not more than to 0.72.

13. The head according to claim 11, wherein the second direction is inclined with respect to the first direction.

14. The head according to claim 11, wherein a first thickness of the first magnetic layer along the first direction is thicker than a third thickness of the third magnetic layer along the first direction, and a second thickness of the second magnetic layer along the first direction is thicker than a fourth thickness of the fourth magnetic layer along the first direction.

15. A magnetic recording device, comprising:

a magnetic head according to claim 11.

* * * * *

UNITED STATES PATENT AND TRADEMARK OFFICE
CERTIFICATE OF CORRECTION

PATENT NO. : 12,165,677 B2
APPLICATION NO. : 18/165101
DATED : December 10, 2024
INVENTOR(S) : Nakagawa et al.

Page 1 of 1

It is certified that error appears in the above-identified patent and that said Letters Patent is hereby corrected as shown below:

In the Claims

• Claim 2, Column 21, Line 31, "than to" should read as --than--.

• Claim 4, Column 21, Line 61, "than to" should read as --than--.

• Claim 12, Column 24, Line 16, "than to" should read as --than--.

Signed and Sealed this
Twenty-fifth Day of March, 2025

Coke Morgan Stewart
*Acting Director of the United States Patent and Trademark Office*